(12) United States Patent
Zhang et al.

(10) Patent No.: US 11,693,286 B2
(45) Date of Patent: Jul. 4, 2023

(54) COA SUBSTRATE AND LIQUID CRYSTAL DISPLAY PANEL

(71) Applicant: SHENZHEN CHINA STAR OPTOELECTRONICS SEMICONDUCTOR DISPLAY TECHNOLOGY CO., LTD., Guangdong (CN)

(72) Inventors: Qi Zhang, Shenzhen (CN); Wu Cao, Shenzhen (CN)

(73) Assignee: SHENZHEN CHINA STAR OPTOELECTRONICS SEMICONDUCTOR DISPLAY TECHNOLOGY CO., LTD, Guangdong (CN)

(*) Notice: Subject to any disclaimer, the term of this patent is extended or adjusted under 35 U.S.C. 154(b) by 389 days.

(21) Appl. No.: 16/645,078

(22) PCT Filed: Jan. 1, 2020

(86) PCT No.: PCT/CN2020/070903
§ 371 (c)(1),
(2) Date: Mar. 6, 2020

(87) PCT Pub. No.: WO2021/128484
PCT Pub. Date: Jul. 1, 2021

(65) Prior Publication Data
US 2022/0004069 A1 Jan. 6, 2022

(30) Foreign Application Priority Data
Dec. 24, 2019 (CN) .......................... 201911348577.0

(51) Int. Cl.
*G02F 1/1362* (2006.01)
*G02F 1/1368* (2006.01)

(52) U.S. Cl.
CPC ...... *G02F 1/136286* (2013.01); *G02F 1/1368* (2013.01); *G02F 1/136209* (2013.01); *G02F 1/136222* (2021.01); *G02F 1/136227* (2013.01)

(58) Field of Classification Search
CPC ......... G02F 1/136286; G02F 1/136222; G02F 1/136209
See application file for complete search history.

(56) References Cited

U.S. PATENT DOCUMENTS

| | | |
|---|---|---|
| 6,462,800 B1 | 10/2002 | Kim et al. |
| 2001/0048500 A1 | 12/2001 | Lim |

(Continued)

FOREIGN PATENT DOCUMENTS

| | | |
|---|---|---|
| CN | 202948237 U | 5/2013 |
| CN | 103676374 A | 3/2014 |

(Continued)

OTHER PUBLICATIONS

Machine translation of CN108732836A) (Year: 2018).*
Machine Translation of CN 106125415 (Year: 2016).*

*Primary Examiner* — Lucy P Chien
(74) *Attorney, Agent, or Firm* — PV IP PC; Wei Te Chung; Zhigang Ma

(57) ABSTRACT

The present disclosure provides a COA substrate and a liquid crystal display panel, the COA substrate comprises a plurality of crisscrossed data lines and scan lines, and a pixel unit composed of the data lines and the scan lines. The pixel unit is divided into an opening region of the pixel unit and a non-opening region of the pixel unit. The data lines, the scan lines, transistor units, a data line black matrix less (DBS) common electrode line, and a pixel through-hole are electrically connected to the transistor unit, which are disposed in the non-opening region. The DBS common elec- (Continued)

trode line in the non-opening region of the pixel unit bypasses the pixel through-hole.

18 Claims, 4 Drawing Sheets

(56) References Cited

U.S. PATENT DOCUMENTS

| | | | |
|---|---|---|---|
| 2004/0189922 | A1 | 9/2004 | Ono et al. |
| 2016/0011466 | A1 | 1/2016 | Choi |
| 2017/0322471 | A1* | 11/2017 | Jeong ................ G02F 1/136286 |

FOREIGN PATENT DOCUMENTS

| | | |
|---|---|---|
| CN | 204595398 U | 8/2015 |
| CN | 106773432 A | 5/2017 |
| CN | 106842684 A | 6/2017 |
| CN | 107479287 A | 12/2017 |
| CN | 108732836 A | 11/2018 |
| CN | 110082970 A | 8/2019 |
| JP | 2001059976 A | 3/2001 |
| KR | 100857134 B1 | 9/2008 |

* cited by examiner

COA SUBSTRATE AND LIQUID CRYSTAL DISPLAY PANEL

FIELD OF INVENTION

The present disclosure relates to the display technology field, and more particularly, to a color film on array (COA) substrate and a liquid crystal display panel.

BACKGROUND OF INVENTION

Multi-domain alignment liquid crystal displays are widely applied in large-sized liquid crystal display panels due to high contrast and wide viewing angles. With the development of screen size toward a larger screen, eight-domain pixel design has been stressed in large-sized display devices because of its excellent viewing angle performance. Although a refinement of pixel size and an increase in the number of domains have severely reduced transmittance of panels, data line black matrix less (DBS) technology improves the transmittance.

In color film on array (COA) substrates, when the pixel size is small, a closed pixel through-hole structure cannot be realized. A shape of the pixel through-hole is a semi-opening shape so that two structures of a pixel electrode and a DBS line occur in a same hole. Because a color resist layer is thick, when a photoresist is irradiated, it is easy for a portion of the color resist layer to accumulate, causing the DBS line to be left in the pixel through-hole, so that the pixel through-hole and the DBS line are short-circuiting.

Thus, in the current liquid crystal display panel technology, the DBS line in the liquid crystal display panels are easily left in the pixel through-hole, causing a problem that the pixel through-hole and the DBS line are short-circuiting, which needs to be solved.

SUMMARY OF INVENTION

Embodiments of the present disclosure provide a COA substrate and a liquid crystal display panel, which are used for solving the problem that the DBS line in the liquid crystal display panels in the prior art easily remains on the pixel through-hole, so that the pixel through-hole and the DBS line are short-circuiting.

In order to solve the above technical problems, the present disclosure provides solutions as follows.

The present disclosure provides a COA substrate, the COA substrate comprises a plurality of crisscrossed data lines and scan lines, and a pixel unit composed of the data lines and the scan lines. The pixel unit is divided into an opening region of the pixel unit and a non-opening region of the pixel unit. The data lines, the scan lines, transistor units, a data line black matrix less (DBS) common electrode line, and a pixel through-hole are electrically connected to the transistor unit, which are disposed in the non-opening region. Each of the pixel units comprises a plurality of sub-pixel units, and the sub-pixel units are divided into a main-pixel region and a sub-pixel region. The DBS common electrode line in the non-opening region of the pixel unit bypasses the pixel through-hole, which prevents a pixel electrode at the pixel through-hole from contacting the DBS common electrode line, causing short-circuiting.

In one embodiment provided by the present disclosure, a shape of the DBS common electrode line in the non-opening region of the pixel unit is Z-shaped.

In one embodiment provided by the present disclosure, a shape of the DBS common electrode line in the non-opening region of the pixel unit is zigzag-shaped, and an opening of the zigzag-shaped is directly disposed opposite to the pixel through-hole.

In one embodiment provided by the present disclosure, a shape of the DBS common electrode line in the non-opening region of the pixel unit is arc-shaped, and an opening of the arc-shaped is directly disposed opposite to the pixel through-hole.

In one embodiment provided by the present disclosure, a width of the DBS common electrode line in the non-opening region of the pixel unit is less than a width of the DBS common electrode line in the opening region of the pixel unit, and a side of the DBS common electrode line located in the non-opening region of the pixel unit away from the pixel through-hole and a side of the DBS common electrode line located in the opening region of the pixel unit away from the pixel through-hole are located on a same line.

In one embodiment provided by the present disclosure, the DBS common electrode line in the opening region of the pixel unit is arranged in parallel to the data lines, and a width of the DBS common electrode line is greater than a width of the data lines, that is, both sides of the data lines in the opening region of the pixel unit do not exceed both sides of a projection of the DBS common electrode line.

In one embodiment provided by the present disclosure, materials of the DBS common electrode line, a main pixel electrode, and a sub-pixel electrode are indium tin oxide.

In one embodiment provided by the present disclosure, the scan lines are parallel to the non-opening region of the pixel unit, and are perpendicular to the data lines.

In one embodiment provided by the present disclosure, the pixel electrode is disposed in each of the main-pixel region and the sub-pixel region, and the pixel electrode is a double-cross pattern electrode.

In one embodiment provided by the present disclosure, the sub-pixel unit is a red sub-pixel, a green sub-pixel, a blue sub-pixel, a white sub-pixel, or a yellow sub-pixel.

The present disclosure provides a COA substrate, the COA substrate comprises a plurality of crisscrossed data lines and scan lines, and a pixel unit composed of the data lines and the scan lines. The pixel unit is divided into an opening region of the pixel unit and a non-opening region of the pixel unit. The data lines, the scan lines, transistor units, a data line black matrix less (DBS) common electrode line, and a pixel through-hole are electrically connected to the transistor unit, which are disposed in the non-opening region. The DBS common electrode line in the non-opening region of the pixel unit bypasses the pixel through-hole, which prevents a pixel electrode at the pixel through-hole from contacting the DBS common electrode line, causing short-circuiting.

In one embodiment provided by the present disclosure, a shape of the DBS common electrode line in the non-opening region of the pixel unit is Z-shaped.

In one embodiment provided by the present disclosure, a shape of the DBS common electrode line in the non-opening region of the pixel unit is zigzag-shaped, and an opening of the zigzag-shaped is directly disposed opposite to the pixel through-hole.

In one embodiment provided by the present disclosure, a shape of the DBS common electrode line in the non-opening region of the pixel unit is arc-shaped, and an opening of the arc-shaped is directly disposed opposite to the pixel through-hole.

In one embodiment provided by the present disclosure, a width of the DBS common electrode line in the non-opening region of the pixel unit is less than a width of the DBS common electrode line in the opening region of the pixel unit, and a side of the DBS common electrode line located in the non-opening region of the pixel unit away from the pixel through-hole and a side of the DBS common electrode line located in the opening region of the pixel unit away from the pixel through-hole are located on a same line.

In one embodiment provided by the present disclosure, the DBS common electrode line in the opening region of the pixel unit is arranged in parallel to the data lines, and a width of the DBS common electrode line is greater than a width of the data lines, that is, both sides of the data lines in the opening region of the pixel unit do not exceed both sides of a projection of the DBS common electrode line.

In one embodiment provided by the present disclosure, materials of the DBS common electrode line, a main pixel electrode, and a sub-pixel electrode are indium tin oxide.

In one embodiment provided by the present disclosure, the scan lines are parallel to the non-opening region of the pixel unit, and are perpendicular to the data lines.

In one embodiment provided by the present disclosure, the pixel electrode is disposed in each of the main-pixel region and the sub-pixel region, and the pixel electrode is a double-cross pattern electrode.

In one embodiment provided by the present disclosure, the sub-pixel unit is a red sub-pixel, a green sub-pixel, a blue sub-pixel, a white sub-pixel, or a yellow sub-pixel.

An embodiment of the present disclosure further provides a liquid crystal display panel. The liquid crystal display panel comprises a first substrate, a second substrate, and a liquid crystal layer between the first substrate and the second substrate, and the first substrate use the COA substrate as any one of the above.

In one embodiment provided by the present disclosure, a black matrix is disposed on the second substrate, and the black matrix is parallel to the scan lines, that is, the black matrix is parallel to the non-opening region of the pixel unit.

Compared with the prior art, there are beneficial effects of the COA substrate and the liquid crystal display panel provided by the present disclosure.

The present disclosure provides the COA substrate, the COA substrate comprises the plurality of crisscrossed data lines and scan lines, and a pixel unit composed of the data lines and the scan lines. The DBS common electrode line in the non-opening region of the pixel unit bypasses the pixel through-hole, which prevents the pixel electrode at the pixel through-hole from contacting the DBS common electrode line, causing short-circuiting.

The present disclosure provides multiple different structures, in order to prevent the pixel electrode at the pixel through-hole from contacting the DBS common electrode line. One is that the DBS common electrode line forms multiple different shapes in the non-opening region of the pixel unit, and the other is that the width of the DBS common electrode line in the non-opening region of the pixel unit is less than the width of the DBS common electrode line in the opening region of the pixel unit, and a side the DBS common electrode line located in the non-opening region of the pixel unit away from of the pixel through-hole and a side the DBS common electrode line located in the opening region of the pixel unit away from of the pixel through-hole are located on a same line, which reduce a risk of the DBS common electrode line contacting the pixel through-hole.

DESCRIPTION OF DRAWINGS

The following detailed description of specific embodiments of the present disclosure will make technical solutions and other beneficial effects of the present disclosure obvious in conjunction with the accompanying drawings.

DETAILED DESCRIPTION OF PREFERRED EMBODIMENTS

Figure 1:
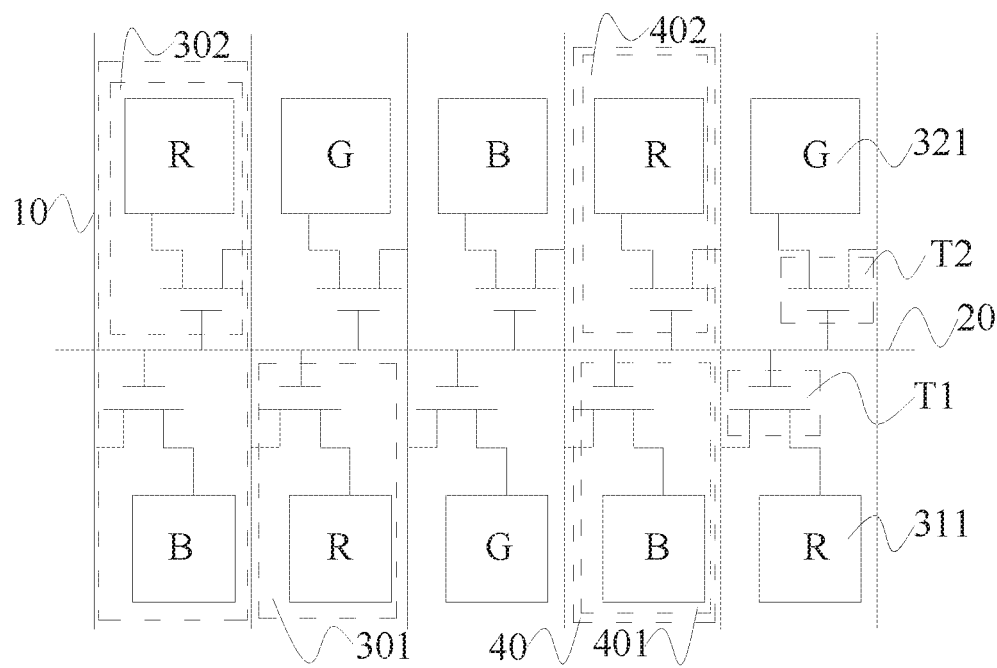
FIG. 1 is a first schematic structural diagram of a COA substrate provided by an embodiment of the present disclosure.

The technical solutions in the embodiments of the present disclosure will be clearly and completely described below in conjunction with accompanying drawings in the embodiments of the present disclosure. Obviously, the embodiments described are merely a part of the present disclosure, rather than all the embodiments. All other embodiments obtained by the person having ordinary skill in the art based on embodiments of the disclosure, without making creative efforts, are within the scope of the present disclosure.

In descriptions of the present disclosure, it should be noted that, orientations or position relationships indicated by the terms, such as "center", "longitudinal", "transverse", "length", "width", "thickness", "upper", "lower", "front", "back", "left", "right", "vertical", "horizontal", "top", "bottom", "inside", "outside", "clockwise", "counterclockwise", etc. are based on the orientations or position relationships shown in the drawings. These are only convenience for describing the present disclosure and simplifying the descriptions, and does not indicate or imply that the device or element must have a specific orientation, a structure and an operation in the specific orientation, so it cannot be understood as a limitation on the present disclosure. In addition, the terms "first" and "second" are used for describing purposes only, and cannot be understood as indicating or implying relative importance or implicitly indicating the number of technical features indicated. Thus, the features defined as "first" and "second" may explicitly or implicitly include one or more of the features. In the descriptions of the present disclosure, the meaning of "plurality" is two or more, unless it is specifically defined otherwise.

In the present disclosure, the terms "mounting", "connected", "fixed" and the like should be broadly understood unless expressly stated or limited otherwise. For example, it may be fixed connected, removably connected, or integrated; it may be mechanically connected, or an electrically connected; it may be directly connected, or indirectly connected through an intermediary; it may be a connection between two elements or an interaction between two elements. For those skilled in the art, the specific meanings of the above terms in the present disclosure may be understood based on specific situations.

In the present disclosure, unless explicitly stated and defined otherwise, the first feature may be "above" or "below" the second feature and may include direct contact between the first and second features. It may also include that the first and second features are not in direct contact but are contacted by another feature between them. Moreover, the first feature is "above" the second feature, including the first feature directly above and obliquely above the second feature, or merely indicates that the first feature is higher in level than the second feature. The first feature is "below" the second feature, including the first feature is directly below and obliquely below the second feature, or only indicates that the first feature is less horizontal than the second feature.

The following disclosure provides many different embodiments or examples for achieving different structures of the present disclosure. To simplify the present disclosure, components and settings of specific examples are described below. They are only examples and are not intended to limit the present disclosure. In addition, the present disclosure may repeat reference numbers and/or reference letters in different examples, this repetition is for the purpose of simplicity and clarity, and does not itself indicate the relationship between various embodiments and/or settings discussed. In addition, the present disclosure provides examples of various specific processes and materials, but those of ordinary skill in the art may be aware of the present disclosure of other processes and/or the use of other materials.

Specifically, refer to FIG. 1 to FIG. 7. Embodiments of the present disclosure provide a COA substrate and a liquid crystal display panel.

Refer to FIG. 1, and the present disclosure provides a COA substrate. The COA substrate comprises a plurality of vertical data lines 10 sequentially arranged in mutually parallel, a plurality of horizontal scan lines 20 sequentially arranged in mutually parallel, and a plurality of sub-pixels 30. A plurality of pixel regions 40 are arranged in an array on the COA substrate, one of the data lines 10 is disposed between each adjacent two rows of the pixel regions 40, one of the scan lines 20 is disposed in each of the pixel regions 40, and the scan line 20 divides the pixel region 40 into a first pixel region 402 and a second pixel region 401. Each of the sub-pixels 30 comprises a main-pixel region 301 and a sub-pixel region 302, the main-pixel region 301 and the sub-pixel region 302 of a same sub-pixel 30 are respectively located in two adjacent pixel regions 40 in a same pixel region 40, the main-pixel region 301 is located in the second pixel region 401 of the pixel region 40 where it is located, and the sub-pixel region 302 is located in the first pixel region 402 of the pixel region 40 where it is located. When the first pixel region 402 and the second pixel region 401 are the same color, the main-pixel region 301 and the sub-pixel region 302 of the same sub-pixel 30 are located in the same pixel region 40.

The main-pixel region 301 and the sub-pixel region 302 of a same sub-pixel 30 are both electrically connected to the data lines 10 between the two pixel regions 40 where they are located.

Specifically, each of the main-pixel region 301 comprises a main-region pixel electrode 311 and a main-region transistor unit T1, and each of the sub-pixel region 302 comprises a sub-region pixel electrode 321 and a sub-region transistor unit T2. A gate of the main-region transistor unit T1 is electrically connected to the scan line 20 corresponding to the sub-pixel 30 where the gate is located, a source of the main-region transistor unit T1 is electrically connected to the data line 10 corresponding to the sub-pixel 30 where the source is located, and a drain of the main-region transistor unit T1 is electrically connected to the main-region pixel electrode 311. A gate of the sub-region transistor unit T2 is electrically connected to the scan line 20 corresponding to the sub-pixel 30 where the gate is located, a source of the sub-region transistor unit T2 is electrically connected to the data line 10 corresponding to the sub-pixel 30 where the source is located, and a drain of the sub-region transistor unit T2 is electrically connected to the sub-region pixel electrode 321.

Furthermore, the main-region pixel electrode 311 and the sub-region pixel electrode 321 both are a double-cross pattern electrode (refer to FIG. 4), that is, the main-region pixel electrode 311 and the sub-region pixel electrode 321 comprise 4 domains, which may control the corresponding liquid crystals to deflect in different directions to improve the color shift phenomenon.

Specifically, the COA substrate of the present disclosure further adopts DBS technology, that is, a DBS common electrode line 50 shielding the plurality of data lines 10 covers the plurality of data lines 10, and the DBS common electrode line 50 is disposed on a same layer as the main-region pixel electrode 311 and the sub-region pixel electrode 321 and arranged at intervals. Preferably, the DBS common electrode line 50 is connected to a COA substrate common voltage, which may control liquid crystal molecules corresponding to positions of the DBS common electrode line 50 to remain undeflected, thereby achieving a purpose of shielding.

Furthermore, the plurality of sub-pixels 30 comprise a red sub-pixel R, a green sub-pixel G, and a blue sub-pixel B. However, the plurality of sub-pixels 30 further comprise sub-pixels of other colors such as a white sub-pixel and a yellow sub-pixel, which does not affect the embodiment of the present disclosure.

Figure 2:
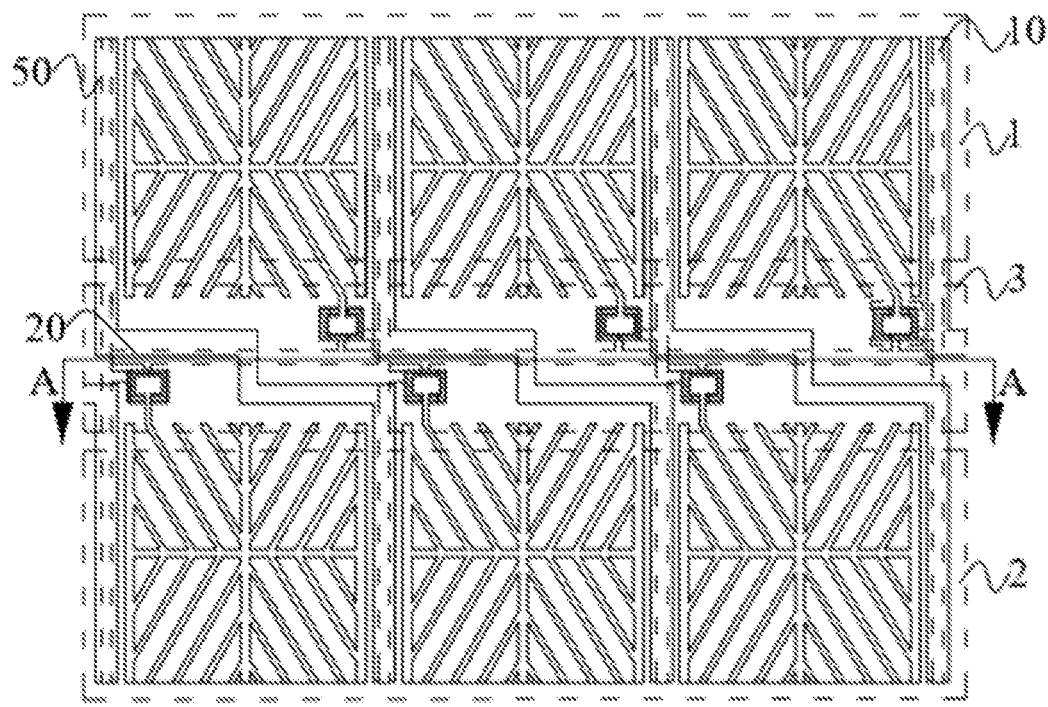
FIG. 2 is a second schematic structural diagram of the COA substrate provided by the embodiment of the present disclosure.

Refer to FIG. 2. FIG. 2 is a second schematic structural diagram of the COA substrate provided by the embodiment of the present disclosure. The pixel unit is divided into opening regions 1 and 2 of the pixel unit, and a non-opening region 3 of the pixel unit. The data lines 10, the scan lines 20, transistor units T1 and T3, the data line black matrix less (DBS) common electrode line 50, and a pixel through-hole electrically connected to the transistor unit are disposed in the non-opening region 3. The DBS common electrode line 50 in the non-opening region 3 of the pixel unit bypasses the pixel through-hole, which prevents the pixel electrode at the pixel through-hole from contacting the DBS common electrode line 50, causing short-circuiting.

Specifically, the transistor units T1 and T2 may be thin film transistors, field effect transistors, or other devices with same characteristics. A source and a drain of the transistor unit used for switching herein are symmetrical, so the source and drain are also interchangeable.

In other embodiments of the present disclosure, the DBS common electrode lines 50 of the opening region 1 and 2 of the pixel unit are parallel to the data lines 10 and are disposed above the data lines 10. The DBS common electrode line 50 in the non-opening region 3 of the pixel unit bypasses the pixel through-hole to form a shape of Z. Refer to FIG. 2. Two sides of the Z shape are parallel to the scan lines, reducing a risk of the pixel through-hole contacting the DBS common electrode line 50.

Figure 3:
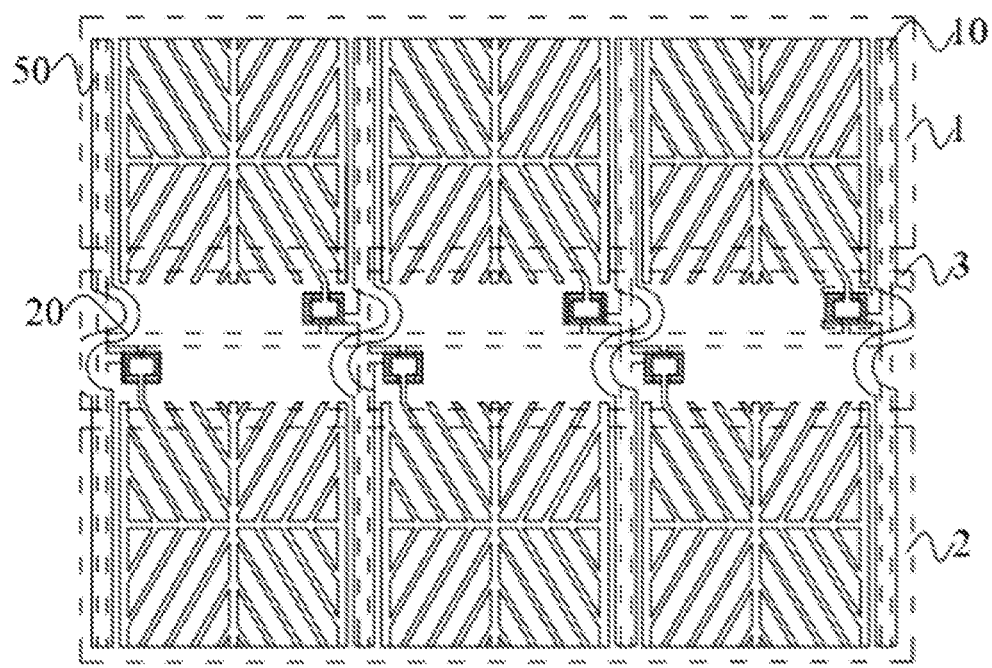
FIG. 3 is a third schematic structural diagram of the COA substrate provided by the embodiment of the present disclosure.

In other embodiments of the present disclosure, the DBS common electrode lines 50 of the opening region 1 and 2 of the pixel unit are parallel to the data lines 10 and are disposed above the data lines 10. The DBS common electrode line 50 in the non-opening region 3 of the pixel unit bypasses the pixel through-hole to form an arc. Refer to FIG. 3. An opening of the arc is directly disposed opposite to the pixel through-hole, reducing the risk of the pixel through-hole contacting the DBS common electrode line 50.

Figure 4:
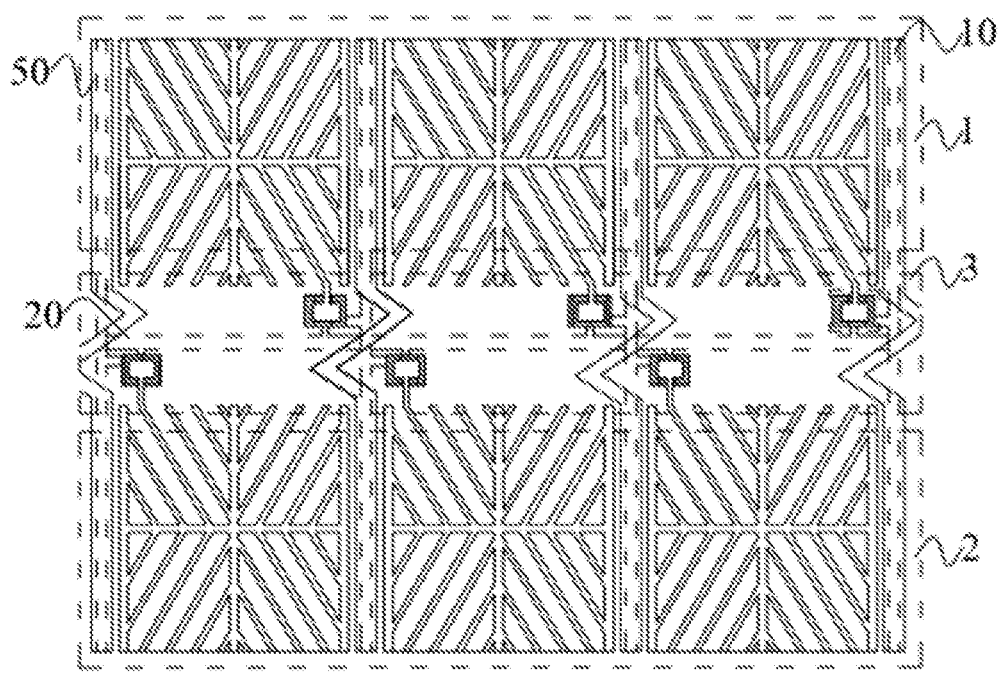
FIG. 4 is a fourth schematic structural diagram of the COA substrate provided by the embodiment of the present disclosure.
Figure 5:
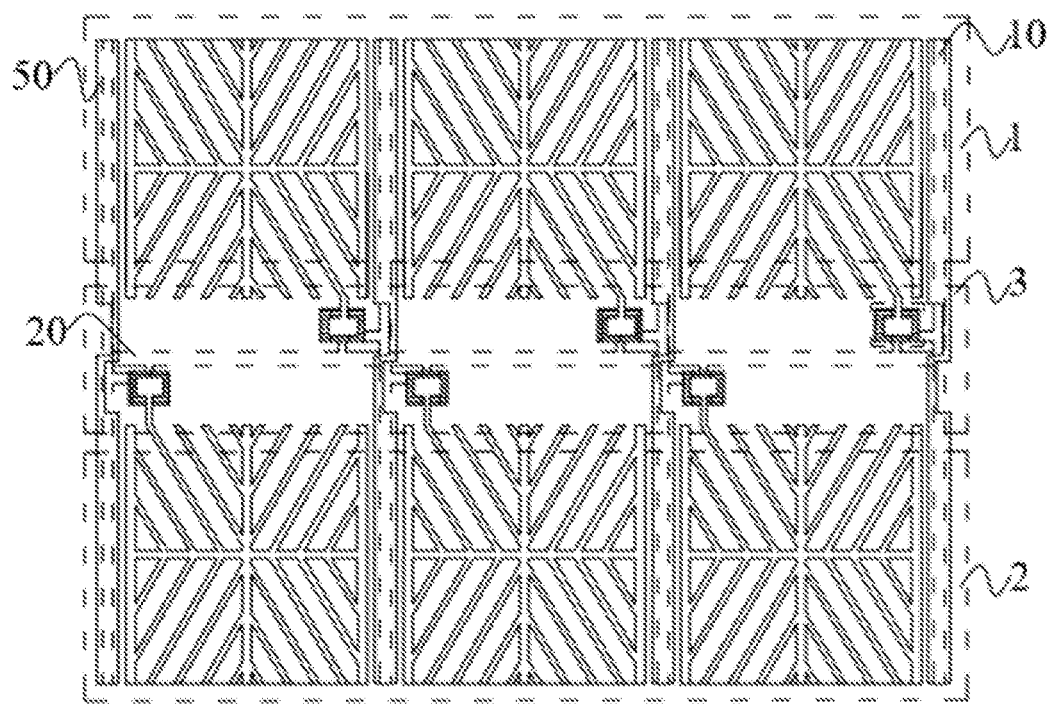
FIG. 5 is a fifth schematic structural diagram of the COA substrate provided by the embodiment of the present disclosure.

In other embodiments of the present disclosure, the DBS common electrode lines 50 of the opening region 1 and 2 of the pixel unit are parallel to the data lines 10 and are disposed above the data lines 10. The DBS common electrode line 50 in the non-opening region 3 of the pixel unit bypasses the pixel through-hole to form a zigzag. Refer to FIG. 4. An opening of the zigzag is directly disposed opposite to the pixel through-hole, reducing the risk of the pixel through-hole contacting the DBS common electrode line 50.

In other embodiments of the present disclosure, a width of the DBS common electrode line 50 in the non-opening region 3 of the pixel unit is less than a width of the DBS common electrode line 50 in the opening regions 1 and 2 of the pixel unit, and a side of the DBS common electrode line 50 located in the non-opening region 3 of the pixel unit away from the pixel through-hole and a side of the DBS common electrode line 50 located in the opening regions 1 and 2 of the pixel unit away from the pixel through-hole are located on a same line. That is, referring to FIG. 5, the DBS common electrode line 50 is as far away from the pixel through-hole as possible in the non-opening region 3 of the pixel unit, reducing the risk of the pixel through-hole contacting the DBS common electrode line 50.

Furthermore, the DBS common electrode line 50 in the opening regions 1 and 2 of the pixel unit is arranged in parallel to the data lines 10, and the width of the DBS common electrode line 50 is greater than a width of the data lines 10, that is, both sides of the data lines 10 in the opening regions 1 and 2 of the pixel unit do not exceed both sides of a projection of the DBS common electrode line 50. The DBS common electrode line 50 may completely cover the data lines 10 in the opening regions 1 and 2 of the pixel unit, preventing the data lines 10 from being irradiated by light and ensuring display quality of the liquid crystal display panels.

Furthermore, the scan lines 20 are parallel to the non-opening region 3 of the pixel unit, and are perpendicular to the data lines 10.

Furthermore, materials of the DBS common electrode line 50, a main pixel electrode, and a sub-pixel electrode are metal oxide such as indium tin oxide.

Figure 6:
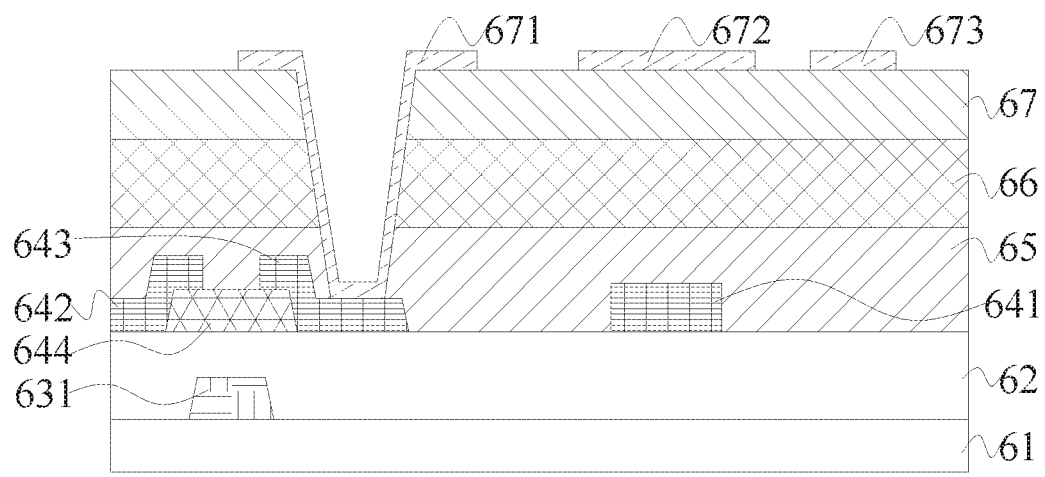
FIG. 6 is a schematic section diagram of the COA substrate provided by the embodiment of the present disclosure corroding to an A-A section line.

Specifically, refer to FIG. 6. FIG. 6 is a schematic section diagram of the COA substrate provided by the embodiment of the present disclosure according to an A-A section line. A COA substrate 3 specifically comprises a first base substrate 61 disposed on the bottom of the COA substrate 3, wherein the first base substrate 61 generally uses a transparent glass substrate; a first insulating layer 62 disposed at a side of the first base substrate, wherein a material of the first insulating layer 62 may be selected from silicon oxide, silicon nitride, or a composite film layer structure combining the aforementioned; a first metal layer 63 disposed in the first insulating layer 62, wherein the first insulating layer 62 is near the side of the first base substrate 61, the first metal layer 63 comprises a scan line and a gate line 631, the scan line outputs current and voltage to the gate line 631, and the first metal layer 63 may generally be made of metals such as molybdenum, aluminum, aluminum-nickel alloy, molybdenum-tungsten alloy, chromium, copper, or titanium-aluminum alloy, or a combination of the aforementioned metal materials; a second insulating layer 65 disposed a side of the first insulating layer 62 away from the first base substrate 61, wherein the second insulating layer 65 may be made of a same material as the first insulating layer 62; a second metal layer 64 disposed in the second insulating layer, wherein the second insulating layer 65 is near a side of the second insulating layer 62, the second metal layer 64 comprises a data lines 641, a source 642, a drain 643, and an active layer 644, the data line provides current to the source and the drain, the source electrode and the drain electrode are respectively electrically connected to a doped region of the active layer, and the second metal layer may be made of a same material as the first metal layer, and moreover the second metal layer is preferably a titanium aluminum alloy; a color resist layer 66 disposed at a side of the second insulating layer 65 away from the first insulating layer 62 and used for color display; and a flattening layer 67 disposed at a side of the color resist layer away from the second insulating layer and used for flattening a surface of the COA substrate.

The pixel through-hole 671, the DBS common electrode line 672, and the pixel electrode 673 are further disposed at a side of the color resist layer away from the flattening layer, wherein the pixel through-hole is electrically connected to the drain through the flattening layer, the color resist layer, and the second insulating layer. The width of the DBS common electrode line is greater than the width of the data lines, and the projection of the DBS common electrode line completely covers the data lines.

Figure 7:
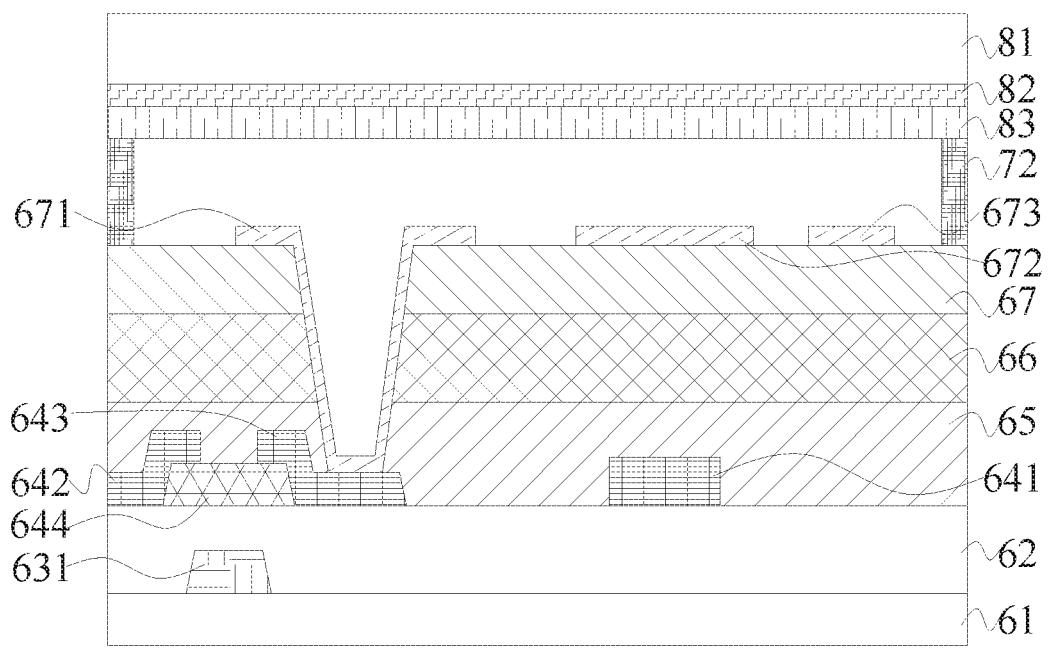
FIG. 7 is a schematic structural diagram of a liquid crystal display panel provided by the embodiment of the present disclosure.

Refer to FIG. 7. FIG. 7 is a schematic structural diagram of a liquid crystal display panel provided by the embodiment of the present disclosure. The liquid crystal display panel comprises a first substrate 6, a second substrate 8, and a liquid crystal layer 7 between the first substrate 6 and the second substrate 8. The first substrate 6 adopts the aforementioned COA substrate 6, and the COA substrate 6 is disposed opposite to the second substrate 8.

Furthermore, the second substrate 8 comprises a second base substrate 81, a black matrix 82, and a common electrode layer 83. The common electrode layer is disposed near a side of the liquid crystal layer 7, the black matrix 82 is disposed at a side of the common electrode layer 83 away from the liquid crystal layer 7, and the second base substrate 81 is disposed at a side of the black matrix 82 away from the common electrode 83.

Furthermore, the liquid crystal layer 7 further comprises liquid crystals 71 and a seal 72 disposed around the liquid crystal and bonding the COA substrate 6 and the second substrate 8.

Therefore, first, the present disclosure provides a COA substrate 6. The COA substrate 6 comprises a plurality of crisscrossed data lines 641 and scan lines, and a pixel unit composed of the data lines and the scan lines. The pixel unit is divided into an opening region of the pixel unit and a non-opening region of the pixel unit. A DBS common electrode line 672 in the non-opening region of the pixel unit bypasses a pixel through-hole 671, which prevents a pixel electrode at the pixel through-hole 671 from contacting the DBS common electrode line 672, causing short-circuiting. Secondly, the present disclosure provides multiple different structures, in order to prevent the pixel through-hole 671 from contacting the DBS common electrode line 672. One structure is that the DBS common electrode line 672 forms multiple different shapes in the non-opening region of the pixel unit, another is that a width of the DBS common electrode line 672 in the non-opening region of the pixel unit is less than a width of the DBS common electrode line 672 in the opening region of the pixel unit, and a side of the DBS common electrode line 672 located in the non-opening region of the pixel unit away from of the pixel through-hole 671 and a side of the DBS common electrode line 672 located in the opening region of the pixel unit away from of the pixel through-hole 671 are located on a same line, which reduces a risk of the DBS common electrode line 672 contacting the pixel through-hole 671.

In the above embodiments, the description of each embodiment has its own emphasis. For a part that is not described in detail in an embodiment, refer to the description of other embodiments.

The COA substrate and the liquid crystal display panel provided in the embodiments of the present disclosure have been described in detail above. The present disclosure uses specific examples to describe principles and embodiments of the present disclosure. The descriptions of the above embodiments are only used to help understand technical solutions of the present disclosure and core ideas thereof. Moreover, those of ordinary skill in the art should understand that the technical solutions described in the aforesaid embodiments can still be modified, or have some technical features equivalently replaced. However, these modifications or replacements do not depart from a scope of the technical solutions of the embodiments of the present disclosure.

What is claimed is:

1. A color film on array (COA) substrate, comprising: a plurality of crisscrossed data lines in a first direction and scan lines in a second direction, and pixel units defined by the data lines and the scan lines; wherein the pixel units are divided into an opening region of the pixel units and a non-opening region of the pixel units; the data lines are disposed between adjacent pixel units, data line black matrix less (DBS) common electrode lines are disposed on the data lines and cover the data lines, and both the data lines and the DBS common electrode lines pass through the opening region and the non-opening region; the scan lines, transistor units, and pixel through-holes electrically connected to the transistor units are disposed in the non-opening region; each of the pixel units comprises a plurality of sub-pixel units, and each of the sub-pixel units is divided into a main-pixel region and a sub-pixel region; and each of the DBS common electrode lines bypasses the pixel through-holes in the non-opening region of the pixel units along the first direction; wherein a shape of the DBS common electrode lines in the non-opening region of the pixel units is zigzag-shaped, and an opening of a zigzag is directly defined opposite to the pixel through-holes.

2. The COA substrate as claimed in claim 1, wherein a shape of the DBS common electrode lines in the non-opening region of the pixel units is Z-shaped.

3. The COA substrate as claimed in claim 1, wherein a shape of the DBS common electrode lines in the non-opening region of the pixel units is arc-shaped, and an opening of an arc is directly defined opposite to the pixel through-holes.

4. The COA substrate as claimed in claim 1, wherein a width of the DBS common electrode lines in the non-opening region of the pixel units is less than a width of the DBS common electrode lines in the opening region of the pixel units, and one side of the DBS common electrode lines located in the non-opening region of the pixel units away from the pixel through-holes and one side of the DBS common electrode lines located in the opening region of the pixel units away from the pixel through-holes are located on a same line.

5. The COA substrate as claimed in claim 1, wherein the DBS common electrode lines in the opening region of the pixel units are arranged in parallel to the data lines, and a width of the DBS common electrode lines is greater than a width of the data lines.

6. The COA substrate as claimed in claim 5, wherein materials of the DBS common electrode lines, a main pixel electrode, and a sub-pixel electrode are indium tin oxide.

7. The COA substrate as claimed in claim 1, wherein the scan lines are parallel to the non-opening region of the pixel units, and are perpendicular to the data lines.

8. The COA substrate as claimed in claim 1, wherein pixel electrodes are disposed in each of the main-pixel region and the sub-pixel region, and the pixel electrodes are double-cross patterned electrodes.

9. The COA substrate as claimed in claim 1, wherein the sub-pixel units comprise a red sub-pixel, a green sub-pixel, a blue sub-pixel, a white sub-pixel, or a yellow sub-pixel.

10. A color film on array (COA) substrate, comprising: a plurality of crisscrossed data lines in a first direction and scan lines in a second direction, and pixel units defined by the data lines and the scan lines; wherein the pixel units are divided into an opening region of the pixel units and a non-opening region of the pixel units; the data lines are disposed between adjacent pixel units, data line black matrix less (DBS) common electrode lines are disposed on the data lines and cover the data lines, and both the data lines and the DBS common electrode lines pass through the opening region and the non-opening region; the scan lines, transistor units, and pixel through-holes electrically connected to the transistor units are disposed in the non-opening region; and each of the DBS common electrode lines bypasses the pixel through-holes in the non-opening region of the pixel units along the first direction; wherein a shape of the DBS common electrode lines in the non-opening region of the pixel units is zigzag-shaped, and an opening of a zigzag is directly defined opposite to the pixel through-holes.

11. The COA substrate as claimed in claim 10, wherein a shape of the DBS common electrode lines in the non-opening region of the pixel units is Z-shaped.

12. The COA substrate as claimed in claim 10, wherein a shape of the DBS common electrode lines in the non-opening region of the pixel units is arc-shaped, and an opening of an arc is directly defined opposite to the pixel through-holes.

13. The COA substrate as claimed in claim 10, wherein a width of the DBS common electrode lines in the non-opening region of the pixel units is less than a width of the DBS common electrode lines in the opening region of the pixel units.

14. The COA substrate as claimed in claim 10, wherein the DBS common electrode lines in the opening region of the pixel units are arranged in parallel to the data lines, and a width of the DBS common electrode lines is greater than a width of the data lines.

15. The COA substrate as claimed in claim 14, wherein materials of the DBS common electrode lines, a main pixel electrode, and a sub-pixel electrode are indium tin oxide.

16. The COA substrate as claimed in claim 10, wherein the scan lines are parallel to the non-opening region of the pixel units, and are perpendicular to the data lines.

17. A liquid crystal display panel, comprising a first substrate, a second substrate, and a liquid crystal layer between the first substrate and the second substrate, wherein the first substrate adopts the COA substrate as claimed in claim 11.

18. The liquid crystal display panel as claimed in claim 17, wherein a black matrix is disposed on the second substrate, and the black matrix is parallel to the scan lines.

\* \* \* \* \*